United States Patent

[11] 3,633,299

| [72] | Inventor | Dale B. Westin<br>25W 223 Lacey Avenue, Naperville, Ill. 60540 |
|---|---|---|
| [21] | Appl. No. | 843,399 |
| [22] | Filed | July 22, 1969 |
| [45] | Patented | Jan. 11, 1972 |

[54] VEHICLE-MOUNTED PORTABLE SIGN
1 Claim, 5 Drawing Figs.

[52] U.S. Cl. .................................................. 40/129 C
[51] Int. Cl. .................................................. G09f 7/00
[50] Field of Search .......................... 40/129, 129 C, 125 L, 125 H, 125

[56] References Cited
UNITED STATES PATENTS

| 2,712,809 | 7/1955 | Clarke | 40/125 N |
| 2,905,134 | 9/1959 | Hornbeck | 40/125 N |
| 2,960,786 | 11/1960 | Wagner | 40/129 C |
| 3,242,329 | 3/1966 | Abrams | 40/129 C |
| 3,284,938 | 11/1966 | Diehl et al. | 40/128 |
| 3,295,242 | 1/1967 | McGregor | 40/129 C |
| 3,471,958 | 10/1969 | Westin | 40/129 C |

*Primary Examiner*—Robert W. Michell
*Assistant Examiner*—Wenceslao J. Contreras
*Attorney*—Roger A. Schmiege ABSTRACT: A vehicle-mounted portable advertising device adapted for use on the top, fender or trunk lid of an automobile, truck etc. which is an improvement in the currently used vehicle top signs.

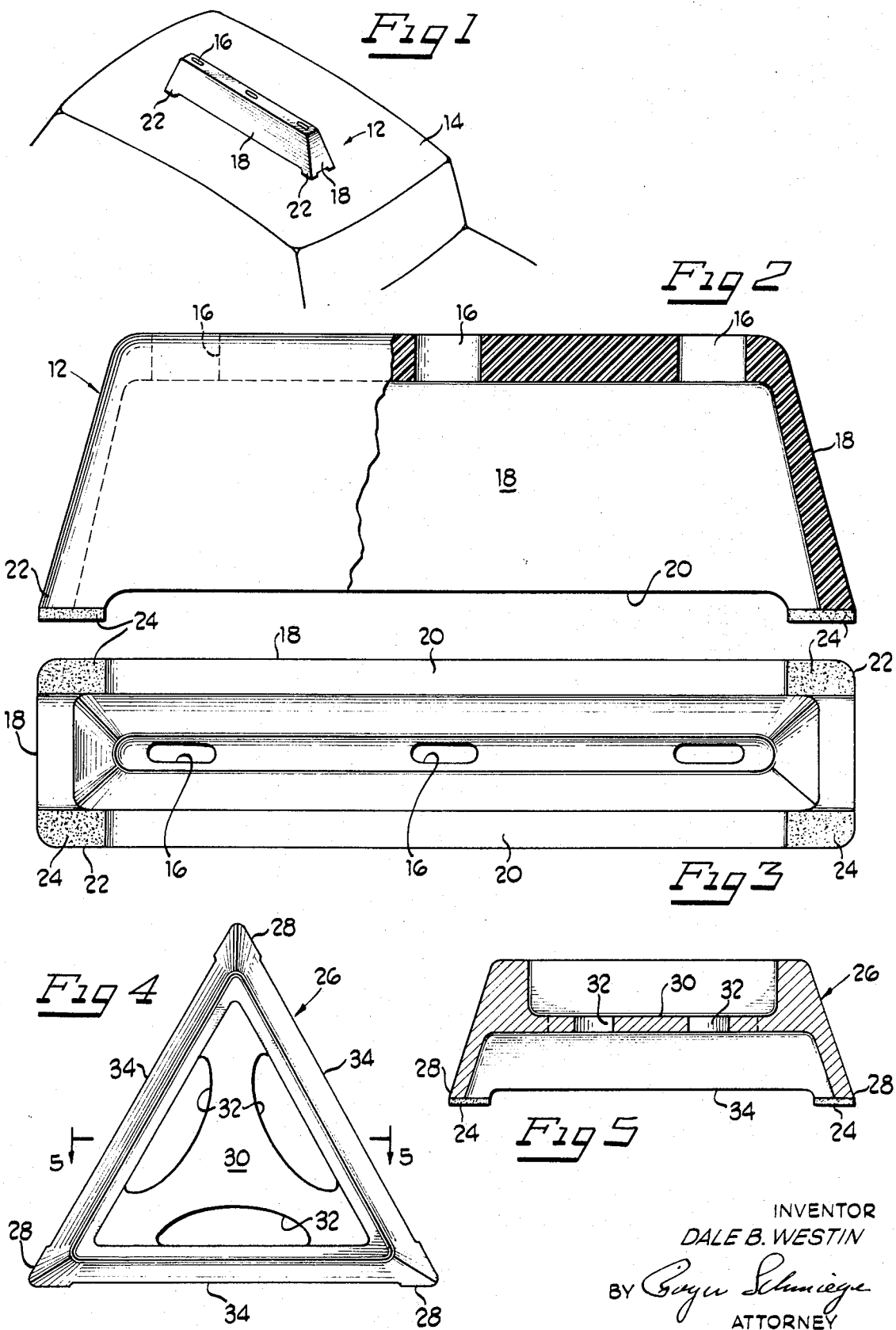

VEHICLE-MOUNTED PORTABLE SIGN

BACKGROUND OF INVENTION

Prior to the instant invention, there were a large variety of advertising signs adapted for placement on a motor vehicle body. Many of these signs were fabricated from paper, sheet steel, plastics and the like, and they were fastened by guy lines, straps, adhesive tabs, etc. The signs normally were somewhat complex in construction as well as the manner in which they were adapted for attachment to the vehicle.

Several of the aforementioned plastic signs were formed from foamed polystyrene and attached by means of adhesive pads. One vehicle sign that utilized a foamed thermoplastic and adhesive pads is shown in the prior art as design U.S. Pat. No. 205,209 issued to Priddis of Kenosha, Wisconsin. This vehicle sign has been utilized as a car top sign. One of the primary disadvantages of this car top sign is that it encounters a substantial amount of wind resistance as a result of its construction and manner of attachment to the top of a vehicle. Further, the level base of the Priddis unit prevents its use on cars with extreme roof curve.

INVENTION

The instant invention is directed to a vehicle sign that has extremely low wind resistance. The sign is portable and may be placed on the top, trunk or fender of a vehicle with a minimum of effort and is easily removed at a moment's notice. The vehicle sign of the instant invention is preferably formed of expandable polystyrene, polypropylene, polyethylene, polyurethane or the like and is provided with air passages spaced at its base. The air passages eliminate wind resistance and provide a maximum amount of airflow through the sign to prevent its being detached from the top, fender or trunk lid of a vehicle.

The invention will be more clearly understood in view of the following description and with specific reference to the accompanying drawings in which:

FIG. 1 is a perspective view of a motor vehicle with the portable sign of this invention thereon.

FIG. 2 is a cross-sectional view of the portable sign shown in FIG. 1.

FIG. 3 is a plan view of the base of the sign shown in FIG. 2.

FIG. 4 is a top plan view of a triangular embodiment of a portable vehicle sign utilizing the same general features of that sign shown in FIGS. 1–3.

FIG. 5 is a cross-sectional view taken on lines 5—5 of FIG. 4.

Referring more particularly to the drawings, wherein like reference characters designate like corresponding parts, and referring particularly to FIG. 1, the numeral 12 generally designates a first embodiment of the portable sign of this invention. The vehicle sign, as indicated, may be centered and placed at the top of an automobile 14 and used to display advertising media. The sign is especially adapted to display political advertising media.

FIG. 2 shows a cross-sectional view of the sign 12. There are apertures 16 spaced along the top of the sign 12 for filling a mold to form an expandable thermoplastic composition into a vehicle sign. In the embodiment, illustrated in FIG. 2, there are apertures 16 which are used to insert thermoplastic material into the mold.

The walls 18 of the sign are formed of cellular or foamed thermoplastic materials, such as expandable polystyrene, polypropylene, polyurethane, polyethylene, etc. The expandable thermoplastic materials have been found entirely suitable, and are preferred over pressed board or solid thermoplastic materials because they are lighter and somewhat more economical. The thermoplastic materials mentioned are not meant to limit the invention and are merely illustrative of the kinds of cellular materials that may be used. Other polymeric and copolymeric materials as well as other compositions may also be used.

At the base of sign 12 there are cutaway portions 20 that allow for the passage of air beneath the sign. These cutaway portions 20 are located between the legs 22 on the front portions of the sign as shown in FIG. 1, as well as between the legs 22 on the side portions as shown in FIG. 2. Thus, legs 22 are elevated from the surface on which the sign 12 is mounted to allow for uneven surfaces. Uneven surfaces are prevalent on many car tops, trucks and fenders due to ridges formed therein as part of the design. The present invention may be mounted on these uneven surfaces without any problems with the level or adherence of the legs to the surface.

The legs 22 on the sign 12 are formed as an integral part of the sign and are provided with adhesive pads 24 at the base thereof which are used to attach the sign to the specific part of the vehicle. The adhesive pads may be formed of a closed cell foam rubber, such as polyurethane, and coated with a removable rubber-based adhesive which forms the innerface between the pad and the vehicle surface. There is normally a cover sheet such as paper or fabric used to cover the adhesive on the pad which cover is removed just prior to placing the sign on the vehicle.

Many commercially available rubber-based adhesives are useful and generally any rubber-based adhesive containing a chlorinated hydrocarbon as the extending agent with a rubbery copolymer as the bonding agent may be used.

The integrally formed legs 22 with their pads 24 are more clearly shown in the base plan view of FIG. 3. It will be noted that the sign is solid foam except for the apertures 16 at the top which are used to fill the mold as mentioned.

The sign shown in FIG. 4 is a triangular modification of the generally rectangular sign shown in FIGS. 1–3. The triangular configuration sign is generally referred to by the numeral 26.

Sign 26 has three legs 28 instead of four and the legs 28 are provided with pads 24 similar to those shown in FIGS. 1–3. It will be noted that the sidewalls of FIGS. 4 and 5 are fastened together by a web 30.

FIG. 5 shows a cross-sectional view of the sign of FIG. 4 wherein the filling apertures 32 are adjacent web 30. It will be noted that there is a cutaway portion 34 at the base portion of the sign between legs 28 to allow passage of air beneath the sign when it is placed on a motor vehicle.

The invention has been described with respect to two primary embodiments; i.e., a rectangular and a triangular embodiment. However, this is by way of illustration and not by way of limitation. The scope of the invention is defined solely by the appended claims which should be construed as broadly as is consistent with the prior art.

What is claimed is:

1. A portable sign for mounting on a vehicle, said sign consisting of a molded thermoplastic body of hollow truncated geometrical shape having an open bottom, said body having tapering side members and leg members formed as integral parts of said body, said sign having at least three leg members provided with adhesive tabs at the base thereof, said leg members extending from said body as to provide a space at the base of said body for passage of air beneath said base and for level placement of said sign on uneven vehicle surfaces, said sign being removably mountable on a vehicle through said adhesive tabs on said leg members, said body portion and leg members of said sign being formed of expanded cellular thermoplastic materials selected from the group consisting of expanded polystyrene, polyethylene, polypropylene, polyurethane and copolymers containing styrene, propylene, ethylene and urethane as one of the comonomers therein.

* * * * *